H. S. HORNBECK.
OSCILLATING VALVE FOR PNEUMATIC MOTORS.
APPLICATION FILED JULY 30, 1920.

1,400,551.

Patented Dec. 20, 1921.

WITNESS
Geo Schwarz

INVENTOR
Henry S. Hornbeck
BY
Redding &
ATTORNEYS

UNITED STATES PATENT OFFICE.

HENRY S. HORNBECK, OF UNION HILL, NEW JERSEY.

OSCILLATING VALVE FOR PNEUMATIC MOTORS.

1,400,551.

Specification of Letters Patent. Patented Dec. 20, 1921.

Application filed July 30, 1920. Serial No. 400,204.

*To all whom it may concern:*

Be it known that I, HENRY S. HORNBECK, a citizen of the United States, residing at Union Hill, in the State of New Jersey, have invented certain new and useful Improvements in Oscillating Valves for Pneumatic-Motors, of which the following is a specification, reference being had to the accompanying drawing, forming a part hereof.

This invention has for its object to produce an improved valve for use in connection with the operating mechanism of pneumatic piano players, such for example, as the motors by which the music rolls are driven. Such players are commonly operated under a partial vacuum and the valves, particularly those which control the operation of the motor bellows, are drawn so tightly to their seats or, more accurately speaking, are pressed by atmospheric pressure so tightly to their seats, that considerable power is required to move them, notwithstanding the means employed to reduce friction. The degree of the vacuum produced, moreover, is not very great and the proportion of power consumed in the movement of the valve is considerable. Furthermore, the use of slide valves in some other parts of such players, although otherwise desirable, is practically prohibited because the movement of the slide valves is retarded or rendered sluggish by reason of the fact that the slide valves, as commonly constructed, are pressed so tightly to their seats. The object of this invention is to provide a valve adapted for the general purposes mentioned but of improved construction such that the friction between the movable part of the valve and the ported face shall be eliminated, the movable part and the ported face being formed concentrically and the movable part being supported upon the concentric axis so that it shall not be in actual contact with the ported face, although so close to the same that the leakage of air shall be negligible. The invention will be more fully explained hereinafter with reference to the accompanying drawing in which it is illustrated and in which—

Figure 1:
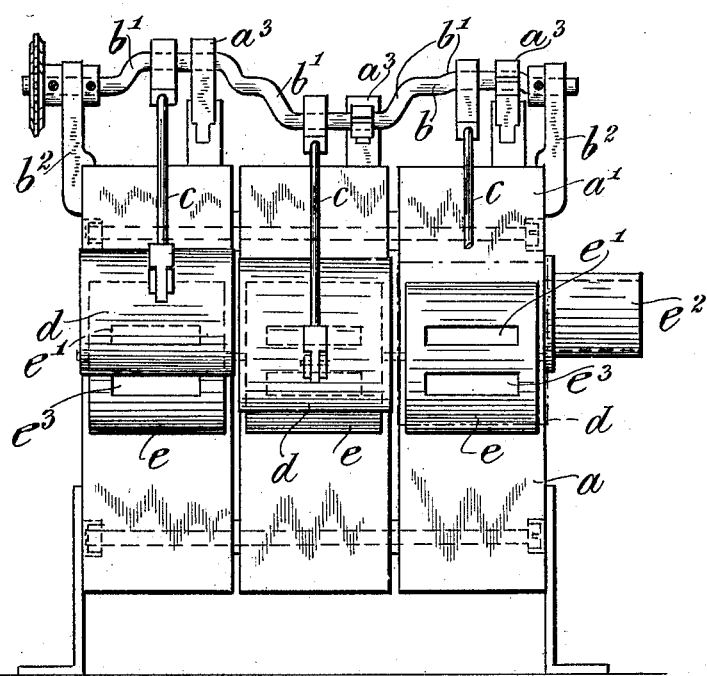
Figure 1 is a view in front elevation of a vacuum motor to which the improved valves are applied, the movable member of one of the valves being removed.
Figure 2:
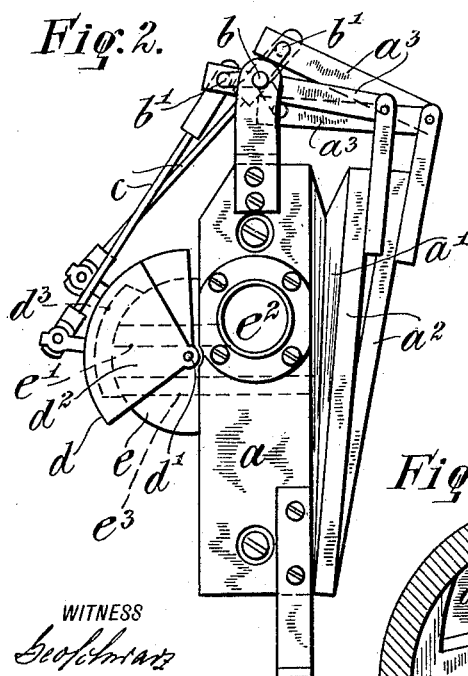
Fig. 2 is a view of the same in side elevation as seen from the right hand in Fig. 1.
Figure 3:
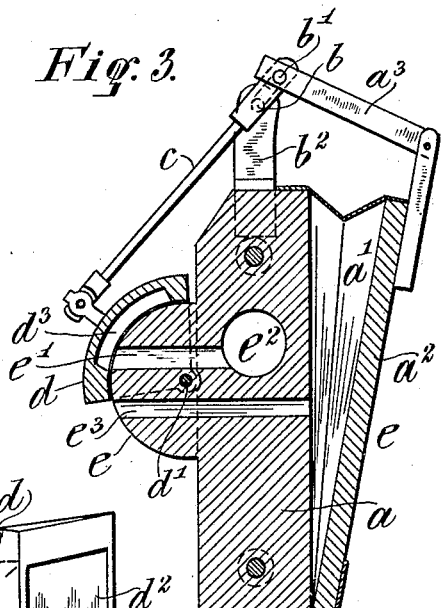
Fig. 3 is a view of the same in vertical section.
Figure 4:
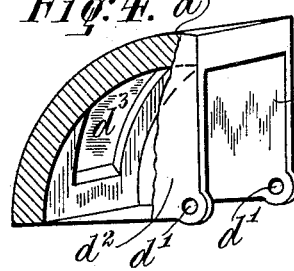
Fig. 4 is a detail view in perspective, partly broken away, of the movable member.

The improved valve is capable of application wherever, in pneumatic players or similar devices, a slide valve is commonly employed, and in fact, wherever a slide valve is capable of being employed although the resistance to its movement, due to the pressure with which it is held against its seat, has heretofore rendered the employment of a slide valve undesirable. The improved valve is shown in the drawing, for purposes of illustration of its character, as applied to a bellows motor $a$ of usual construction, having, in the present instance, three motor bellows $a'$ which respectively have each its movable member $a^2$ connected by a link $a^3$ with the corresponding crank $b'$ of the usual crank shaft $b$, suitably mounted in brackets $b^2$. Each crank $b'$ is also shown as connected, in the usual manner, by a link $c$ with the movable member $d$ of the valve construction. The body $a$ of the motor is formed with a concentric surface $e$, of such width across its face and of such angular amplitude as may be required by the conditions of use and, in the construction shown, has a port $e'$ in connection with the windway $e^2$, which in turn is connected with the vacuum system, and a port $e^3$ which communicates with the interior of the bellows $a'$. The movable member $d$ is formed as to its inner face concentric with the ported face $e$ and is conformed thereto with a free sliding fit, being fitted as accurately as possible without actual contact. It is also supported to oscillate on the same axis as that of the ported face $e$, as at $d'$, as by arms $d^2$ which are conveniently but not necessarily quadrantal. The body $d$ of the movable member completely covers and overlaps the ports $e'$ and $e^3$ and it has formed in its inner face a channel $d^3$ which is of such length as to place ports $e'$ and $e^3$ in communication when the movable member $d$ is in proper relative position, as shown in Fig. 2, for example. When the movable member $d$ is in the relative position shown in Fig. 1, it covers completely the port $e'$ and uncovers the port $e^3$ so that air at atmospheric pressure may enter the corresponding bellows $a'$ and permit the same to expand. As the movable member is moved to the position shown in Fig. 2, and in the middle of Fig. 1, it places both ports $e'$ and $e^3$ in communication through the channel $d^3$ and thereby places the corresponding bellows $a'$ in communication with the vacuum system so that the bellows is collapsed. As the inner face of the movable member is out of contact with the ported face and as the movable member is supported concentrically with the ported face on pivots suitably formed to reduce friction, the movable member is moved with little absorption of power and without being affected in its movements by the atmospheric pressure. The construction therefore permits a vacuum motor to be operated with great ease and with very little power and therefore renders the operation of the motor easy and immediately responsive to variations in vacuum and for other uses than in connection with a vacuum motor, is easy in operation, instantly responsive and free from that sluggishness in movement which characterizes the ordinary exposed slide valve.

I claim as my invention:

In a valve for pneumatic motors, the combination of a concentric ported face and a movable valve member concentric with the ported face, supported on an axis concentric with the ported face and having formed in its inner face a channel for coöperation with the ports of the ported face.

This specification signed this twenty-eighth day of July A. D. 1920.

HENRY S. HORNBECK.